United States Patent
Khan et al.

(10) Patent No.: US 12,018,722 B1
(45) Date of Patent: Jun. 25, 2024

(54) METHODS AND APPARATUS FOR THERMAL MANAGEMENT OF SUMPS USING OLEOPHILIC AND OLEOPHOBIC COATINGS

(71) Applicant: General Electric Company, Schenectady, NY (US)

(72) Inventors: Arman Mohammad Khan, Bengaluru (IN); Souvik Math, Bengaluru (IN); Ravindra Shankar Ganiger, Bengaluru (IN); Arundhati Sengupta, Bengaluru (IN); Santosh Prasad, Bengaluru (IN); Duane H Anstead, Evendale, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/305,139

(22) Filed: Apr. 21, 2023

(51) Int. Cl.
  *F16C 33/66* (2006.01)
  *F01M 11/00* (2006.01)
  *F02C 7/06* (2006.01)

(52) U.S. Cl.
  CPC ..... *F16C 33/6685* (2013.01); *F01M 11/0004* (2013.01); *F02C 7/06* (2013.01); *F01M 2011/0091* (2013.01); *F16C 2360/23* (2013.01)

(58) Field of Classification Search
  CPC ........ F01M 11/0004; F01M 2011/0091; F02C 7/06; F16C 33/6685; F16C 2360/23
  See application file for complete search history.

(56) References Cited

U.S. PATENT DOCUMENTS

| | | | | |
|---|---|---|---|---|
| 4,384,725 | A | * | 5/1983 | Nenov ..................... F16J 15/43 277/944 |
| 4,820,948 | A | * | 4/1989 | Rogelein ............... F16C 33/103 310/90 |
| 8,783,959 | B2 | | 7/2014 | Haag et al. |
| 10,024,362 | B2 | * | 7/2018 | Diener .................. F16C 33/664 |
| 10,233,934 | B2 | | 3/2019 | Marya et al. |
| 10,451,211 | B2 | | 10/2019 | Herring et al. |

(Continued)

FOREIGN PATENT DOCUMENTS

| | | |
|---|---|---|
| DE | 102009053002 | 5/2011 |
| DE | 102011088232 | 6/2013 |

(Continued)

OTHER PUBLICATIONS

Bonanno et al., "Use of Nanostructured Coating to Improve Heat Exchanger Efficiency," Factories of the Future, published on Feb. 15, 2019, pp. 275-292, retrieved from https://doi.org/10.1007/978-3-319-94358-9_13.

(Continued)

*Primary Examiner* — Michael R Mansen
*Assistant Examiner* — Mark K Buse
(74) *Attorney, Agent, or Firm* — HANLEY, FLIGHT & ZIMMERMAN, LLC (57) ABSTRACT

Oleophobic and/or oleophilic coatings to reduce heat loads on a gas turbine engine thermal management system are disclosed herein. An example method to reduce heat load in a gas turbine engine includes applying an oleophobic coating to an internal wall of a sump, the sump located in proximity to a heat generating element of the gas turbine engine, and applying an oleophilic coating to the heat generating element of the gas turbine engine, the heat generating element positioned in a cavity of the sump.

20 Claims, 5 Drawing Sheets

(56) References Cited

U.S. PATENT DOCUMENTS

| | | | |
|---|---|---|---|
| 10,801,408 B2 | 10/2020 | Dierksmeier et al. | |
| 10,947,925 B2 | 3/2021 | Singh et al. | |
| 11,459,952 B2 | 10/2022 | Rendina et al. | |
| 2006/0121315 A1* | 6/2006 | Myli | C23C 14/08 428/702 |
| 2013/0147123 A1 | 6/2013 | Davies et al. | |
| 2015/0030274 A1* | 1/2015 | Adane | F16C 33/60 384/469 |
| 2016/0177959 A1 | 6/2016 | Marya et al. | |
| 2017/0219010 A1* | 8/2017 | Diener | F16C 33/32 |
| 2022/0120191 A1* | 4/2022 | Sato | F02B 37/00 |
| 2022/0282177 A1 | 9/2022 | Heise et al. | |

FOREIGN PATENT DOCUMENTS

| | | |
|---|---|---|
| DE | 102020131655 | 6/2022 |
| JP | 2019081166 | 5/2019 |

OTHER PUBLICATIONS

Ye et al., "Electrothermally Tunable Graphene Resonators Operating at Very High Temperature up to 1200 K," Nano Letters, published on Jan. 31, 2018, pp. 1678-1685, vol. 18, No. 3, retrieved from https://pubs.acs.org/doi/pdf/10.1021/acs.nanolett.7b04685.

Solfiti et al., "A review on thermophysical properties of flexible graphite," Procedia Structural Integrity, published Jun. 30, 2020, pp. 187-198, vol. 26, retrieved from https://www.sciencedirect.com/science/article/pii/S2452321620304303.

Jackson et al., "Effect of surface wettability on carbon nanotube water-based nanofluid droplet impingement heat transfer," Journal of Physics: Conference Series, published Jun. 2014, vol. 525, retrieved from https://iopscience.iop.org/article/10.1088/1742-6596/525/1/012024.

* cited by examiner

METHODS AND APPARATUS FOR THERMAL MANAGEMENT OF SUMPS USING OLEOPHILIC AND OLEOPHOBIC COATINGS

FIELD OF THE DISCLOSURE

This disclosure relates generally to thermal management of engine components, and, more particularly, to thermal management of sumps.

BACKGROUND

Aircraft typically include various accessory systems supporting the operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

BRIEF DESCRIPTION OF THE DRAWINGS

A full and enabling disclosure of the present technology, including the best mode thereof, directed to one of ordinary skill in the art, is set forth in the specification, which makes reference to the appended Figures, in which.

In general, the same reference numbers will be used throughout the drawing(s) and accompanying written description to refer to the same or like parts. The figures are not substantially to scale.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this application, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

A turbine engine, also referred to herein as a gas turbine engine, is a type of internal combustion engine that uses atmospheric air as a moving fluid. The gas turbine engine is a turbofan engine that includes a fan section upstream of a low-pressure compressor section and a bypass airflow passage. During operation, a volume of air enters an inlet of the engine and passes into the fan section. A first portion of air is directed or routed into the bypass airflow passage, and a second portion of air is directed or routed into the low-pressure compressor section where the pressure of the air is increased. The pressure of the second portion of air is further increased as it is routed through a high-pressure compressor section and into a combustion chamber where the pressurized air is mixed with fuel and burned to provide combustion gases. Subsequently, the combustion gases are routed through a high-pressure turbine section and a low-pressure turbine section, where a portion of thermal and/or kinetic energy from the combustion gases is extracted.

The combustion gases are then routed through a jet exhaust nozzle section of the gas turbine engine to provide propulsive thrust. Simultaneously, the pressure of the first portion of air is substantially increased as the first portion of air is routed through the bypass airflow passage before it is exhausted from a fan nozzle exhaust section of the turbofan engine, also providing propulsive thrust. The combination of propulsive thrusts from the first and second portions of air determines an overall thrust that the turbofan engine generates to propel the aircraft in flight. In this sense, the power of the gas turbine engine can be defined as a product of the overall thrust and the cruising speed of the aircraft.

The gas turbine engine includes one or more shafts which are mounted for rotation in several bearings, usually of the rolling-element type. The bearings are enclosed in enclosures known as sumps, which are pressurized and provided with an oil flow for lubrication and cooling. A sump is a container (e.g., a lower part of a crankcase of an internal-combustion engine) into which liquids can drain and be reused. For example, oil drains into the sump to avoid a build-up in the crankcase. The sump can provide multiple functions, including physical mounting of bearing races, location of oil and air seals, supply of lubricating oil to the bearings, scavenging spent oil, pressurization of the sump, and/or ventilation. In some examples, a sump housing includes numerous tubes, internal passages, and/or structural elements. For example, the sump housing incorporates a radial array of service tubes, which serve different functional purposes and have different internal flowpaths. In aero-engines, multiple structures such as bearings, seals and/or gear box components generate heat. As such, oil is supplied to lubricate and cool the components. In some examples, oil heat pickup is a heat load to coolers and one of the factors contributing to sizing of thermal management system (TMS) components. In particular, improved thermal management of sumps located in the gas turbine engine would permit reduction of heat loads.

Methods and apparatus disclosed herein use oleophobic and/or oleophilic coatings to reduce heat loads on TMS components. In examples disclosed herein, oleophobic and/or oleophilic coatings are used at select locations in and/or on sumps to provide thermal management of the sumps. More specifically, oleophobic coatings with a high heat transfer coefficient (HTC) on internal walls of a sump can drive oil flow towards scavenge ports at an increased speed to enhance heat transfer from sump walls to the oil. Alternatively or additionally, oleophilic coatings on areas near the bearings and/or seals spread the oil and result in efficient transfer of heat from hot surface(s) near the bearings and/or seals to the oil. Furthermore, aero/oleo phobic coatings with low HTC on sump external walls (e.g., especially on hot sumps) can act as a heat shield and reduce the sump heat retained from hot surroundings.

Figure 1:
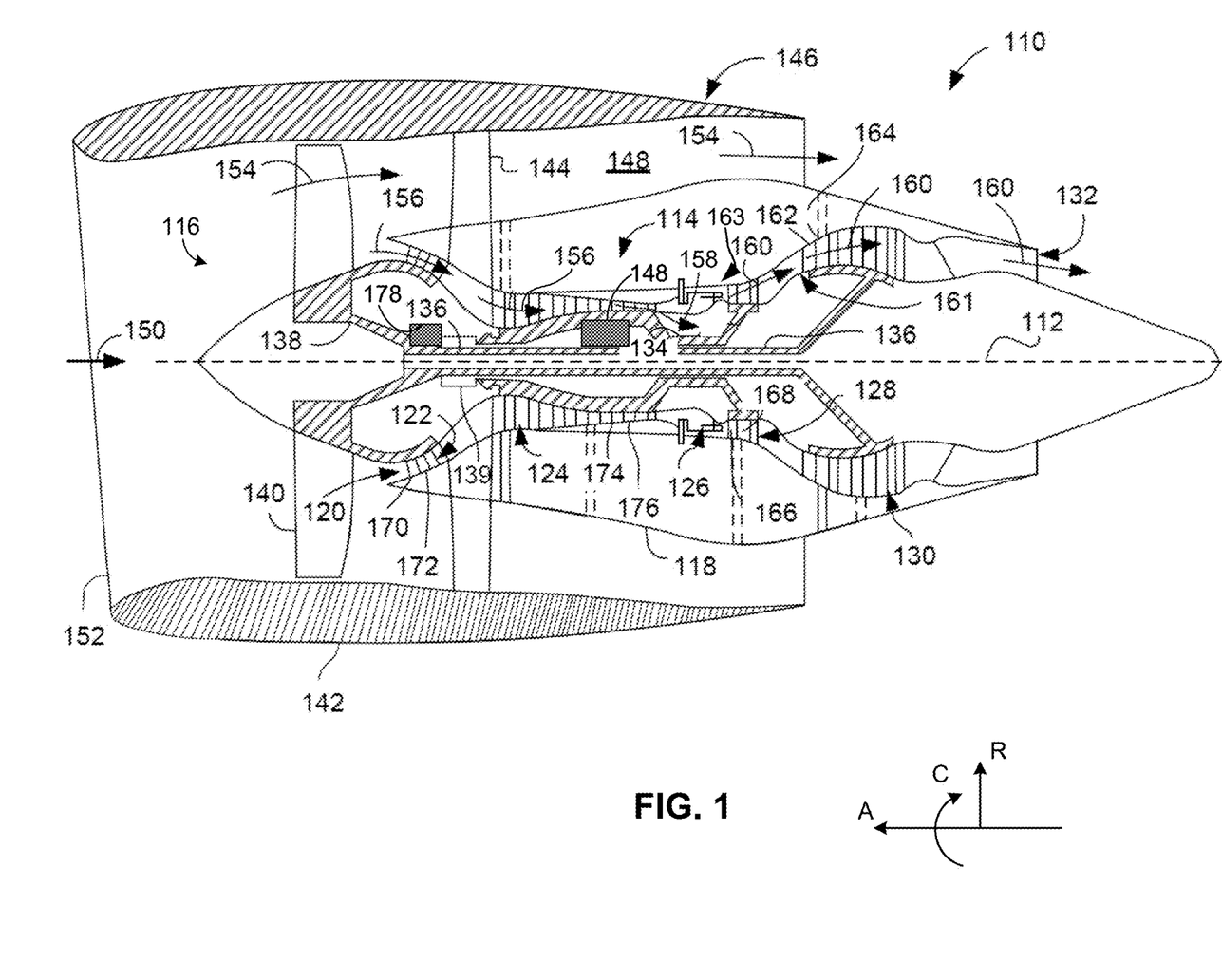
FIG. 1 is a cross-sectional view of a gas turbine engine in which examples disclosed herein may be implemented.

For the figures disclosed herein, identical numerals indicate the same elements throughout the figures. Referring now to the drawings, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, propfans, etc. As shown in FIG. 1, the turbofan engine 110 defines a longitudinal or axial centerline axis 112 extending therethrough for reference. FIG. 1 also includes an annotated directional diagram with reference to an axial direction A, a circumferential direction C, and a radial direction R.

In general, the turbofan engine 110 includes a core turbine 114 of gas turbine engine 110 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low-pressure compressor 122 ("LP compressor 122") and a high pressure compressor 124 ("HP compressor 124"), a combustion section 126, a turbine section having a high pressure turbine 128 ("HP turbine 128") and a low-pressure turbine 130 ("LP turbine 130"), and an exhaust section 132. A high pressure shaft or spool 134 ("HP shaft 134") drivingly couples the HP turbine 128 and the HP compressor 124. A low-pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative (e.g., partially supported, etc.) to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with a turbine housing 163 and forming an aerodynamic transition duct between the HP turbine 128 and the LP turbine 130. Fairings form a fluid pathway between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing 163 and form an aerodynamic transition duct between the HP turbine 128 and the LP turbine 130. As such, air flows through the turbine frame 161 between the HP turbine 128 and the LP turbine 130.

In FIG. 1, the gas turbine engine 110 includes a first sump 178 and a second sump 180, which include cavities that contain oil. The oil of the first sump 178 and the second sump 180 lubricate and cool the components of the gas turbine engine 110, including the bearings and rotating components associated with the HP shaft 134, the LP shaft 136 and the fan shaft 138. In FIG. 1, the first sump 178 is associated with the fan shaft 138 and the second sump 180 is disposed in the LP shaft 136. It should be appreciated that the gas turbine engine 110 can include sumps in addition to the first sump 178 and the second sump 180 (e.g., one or more other sumps associated with the LP shaft 136, one or more other sumps associated with the fan shaft 138, one or more sumps associated with the HP shaft 134, etc.).

Figure 2A:
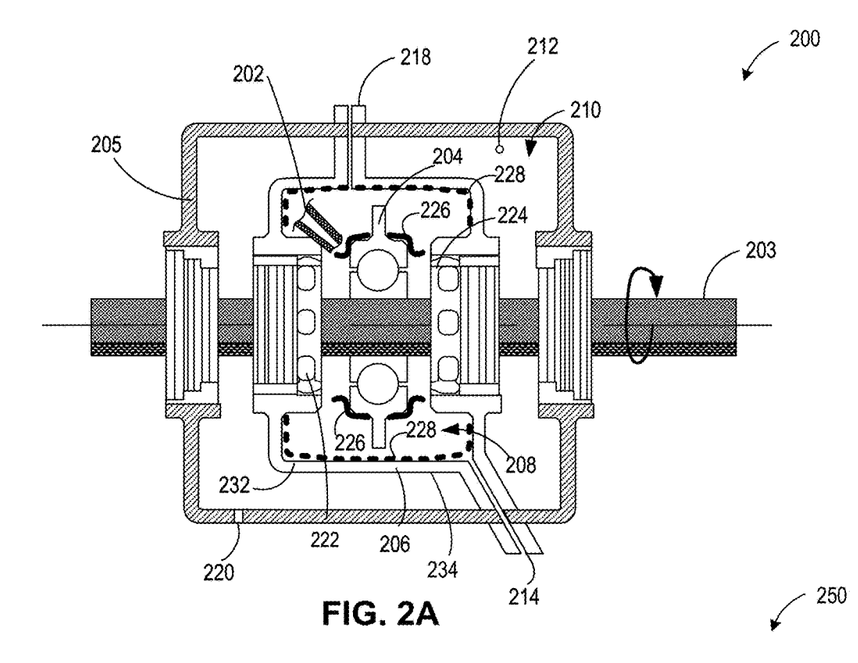
FIG. 2A illustrates an example sump positioned in the gas turbine engine of FIG. 1.

FIG. 2A illustrates an example bearing sump system 200 positioned in the gas turbine engine 110 of FIG. 1. The example bearing sump system 200 can be a wet-sump lubrication system or a dry-sump lubrication system. A wet-sump lubrication system is generally used in aviation-based gas turbine engines (e.g., as opposed to a dry-sump lubrication system). In a wet-sump lubrication system, sump elements are close to hot regions of the gas turbine engine 110. Engine sump systems (e.g., such as bearing sump system 200) contain oil used to lubricate and cool gas turbine engine 110 components, such as bearings used to support the spools of the gas turbine engine 110. For example, lubrication oil is stored in the engine cavities. Further increasing the shaft speed of engines results in larger oil requirements of the gas turbine engine 110.

To ensure continued operation of the gas turbine engine 110 and to conserve oil, the oil present in the bearing sump system 200 is separated from air entering the gas turbine engine 110. In the example of FIG. 2A, the oil is distributed to the bearing sump system 200 from an oil jet 202. For example, the oil is provided directly from the oil jet 202 to one or more heat-generating elements 204 (e.g., mewl sleeves encircling the rotating components of the gas turbine engine 110, particularly the heat-generating elements 204 that can include bearing housing and/or seal runners, etc.) in connection with a rotating shaft 203. The bearing sump system 200 includes an example air seal 205 (e.g., sump air housing) and an example oil seal 206 to prevent oil leakage from the bearing sump system 200. An example first cavity 208 includes regions of the bearing sump system 200 at which oil is ejected from the oil jet 202, while an example second cavity 210 includes injection of compressed air using an example pressurizing port 212. In some examples, the first cavity 208 is bounded by heat generating element(s) 204 (e.g., bearings) and an internal wall 232 if the sump. In some examples, the second cavity 210 is bounded by the air seal 205 and an external wall 234 of the sump. For example, the second cavity 210 is positioned between the air seal 205 and the oil seal 206 and can be pressurized by air ejectors (e.g., eighth-stage air ejectors, not shown), such that the pressure in the second cavity 210 is greater than the pressure in the first cavity 208 of the bearing sump system 200.

As air (e.g., bleed air from a compressor stage) flows from the second cavity 210 and across the oil seal 206, the oil is prevented from leaking across the oil seal 206. Furthermore, if oil does escape the first cavity 208, the pressure of the air coming from the second cavity 210 contains the escaped oil on the other side of the oil seal 206. Subsequently, scavenge oil is drawn from the bearing sump system 200 into a pump (not shown) via an example oil drain 214. The oil can be circulated using pumps (e.g., driven by rotation of the gas turbine engine 110), with one pump used to supply the oil and another pump used to scavenge the oil. Pump(s) used for oil scavenging can include a higher capacity to prevent oil from accumulating in the bearing sump system 200. In some examples, oil extracted from the oil drain 214 can be disposed of overboard or returned to an oil tank. The oil serves to lubricate the bearings and gears of the gas turbine engine 110 while also removing heat generated by the engine components.

In the example of FIG. 2A, the bearing sump system 200 includes a sump vent 218 in connection with the first cavity 208 and a cavity drain 220 in connection with the air seal 205 enclosing the second cavity 210. The first cavity 208 of the bearing sump system 200 surrounding the rotating shaft 203 includes an example windback seal 222 to prevent oil migration from the first cavity 208 as part of shaft sealing. Additionally, an example chopper 224 provides grooves to create a counter-pressure with the rotating shaft 203, further reducing oil leakage from the first cavity 208. Higher mechanical rotor speeds place a higher burden on the oil system (not shown) to lubricate and cool the rotating components. Methods and apparatus disclosed herein permit for sump system-based heat load management using oleophilic and/or oleophobic coatings, which are described in more detail in connection with FIG. 2B. For example, an oleophobic coating 228 with a high heat transfer coefficient (HTC) can be added to the internal walls (e.g., an internal wall 232) of the bearing sump system 200 (e.g., enclosing the first cavity 208), driving the oil flow originating from the oil jet 202 towards the oil drain 214, resulting in an enhanced transfer of heat from the sump's first cavity 208 walls to the oil. Conversely, an example oleophilic coating 226 on areas near heat-generation elements (e.g., bearings, seals, etc.) will cause the oil to spread and result in efficient transfer of heat from hot surfaces (e.g., side faces of cage, carbon seal runner, etc.) to the oil. In some examples, aero/oleo phobic coatings with a low heat transfer coefficient (HTC) on the sump's external walls (e.g., an external wall 234)) act as a heat shield and reduce sump-based heat pick up from hot surroundings (e.g., in the first cavity 208). As such, examples disclosed herein introduce novel sump wall surface engineering with a combination of oil dispersion oleophilic surfaces and oil contraction/oil skidding phobic surfaces. In some examples, the surface engineering methodology (e.g., oleophilic/phobic deposition) disclosed herein can be defined for a sump depending on sump components. For example, oleophilic surface deposition near the bearing/heat-generating elements 204 permits efficient transfer of heat to oil, while phobic surface deposition on sump walls (e.g., inner walls of the oil seal 206 facing the first cavity 208) reduces oil residence time, resulting in lower viscous heat generation. Additionally, oleophobic surface deposition on hot sump walls reduces coking.

Figure 2B:
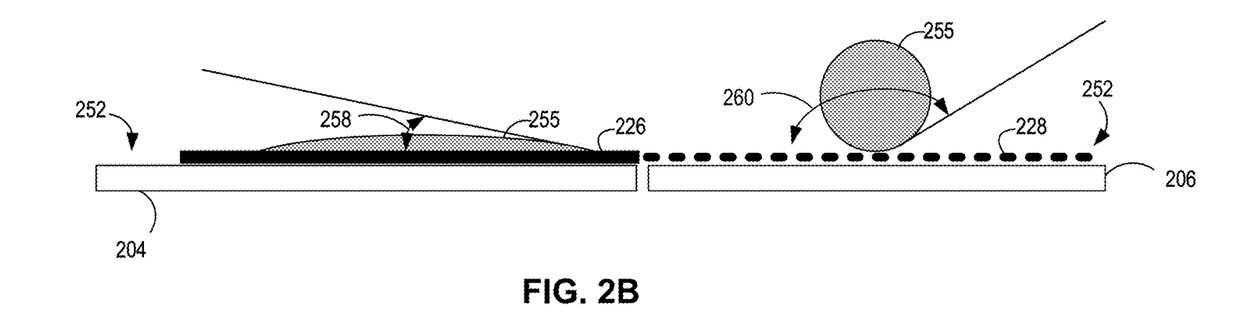
FIG. 2B illustrates example oleophilic and oleophobic coating(s) applied to the sump of FIG. 1.

FIG. 2B illustrates an example schematic 250 of oleophilic and oleophobic coating(s) 226, 228 applied to the bearing sump system 200 of FIG. 2A (e.g., including the oil seal 206 walls and the bearing/heat-generating elements 204). For example, a surface 252 can be modified (e.g., using an oleophilic coating 226 on heat-generation element(s) 204) to absorb nonpolar liquids (e.g., oil) or modified (e.g., using an oleophobic coating 228 on the oil seal 206) to repel nonpolar liquids (e.g., oil). As shown in the example of FIG. 2B, oleophilic and oleophobic surfaces can be characterized based on a contact angle of an example oil droplet 255 with the oleophilic and oleophobic surface. In the example of the oleophilic coating 226 applied to the surface 252, the oil droplet 255 spreads out on the oleophilic coating 226, resulting in a minimum contact angle 258 (e.g., less than 5 degrees). In the example of the oleophobic coating 228 applied to the surface 252, the oil droplet 255 is repelled by the oleophobic coating 228, resulting in a maximum contact angle 260 (e.g., greater than 90 degrees). In examples disclosed herein, the use of oleophilic and oleophobic coating(s) 226, 228 for thermal management of bearings and/or sumps results in lubrication oil durability and the improvement of bearing service life, with an up to 30% improvement in heat management. As such, improved reliability of heat generating elements (e.g., bearings) through a longer service life contributes to a significant weight reduction with the use of more compact heat exchangers. For example, depending on the chemistry of the coatings used, oleophobic coatings can increase the HTC, allowing improved efficiency of heat exchangers in the gas turbine engine 110.

In the example of FIG. 2A, heat-generating elements 204 can include bearing housing and/or seal runners. Using oleophilic-based coatings (e.g., graphite, graphene, and/or carbon nanotube-based sponges) as disclosed herein (e.g., oleophilic coating 226) results in near zero oil-based contact angles driven by very high oil dispersion. Increases in oil dispersion using oleophilic coatings contributes to high thermal conductivity (K) (e.g., K=3,500 Watts per meter-Kelvin (W/mK), up to an 80% increase in thermal conductivity). Furthermore, application of oleophilic-based coatings near heat generating elements contributes to higher surface oil contact for effective heat extraction (e.g., a dispersion of approximately 200-300%). As such, a reduction in the temperature of heat-generating elements 204 (e.g., bearing housing, etc.) is further achieved based on the application of the oleophilic coating (e.g., a 5% reduction in metal temperatures). As a result, oil provided via the oil jet 202 protects and prolongs the life of the machined parts (e.g., preventing metal from touching other metallic surfaces while in motion).

In some examples, oleophobic coating 228 can be applied to cold sumps and/or hot sumps (e.g., internal and/or external sump walls surrounding the first cavity 208), as described in more detail in connection with FIGS. 4 and 5. For example, hot and cold sumps can be identified based on a temperature of air in the pressurizing port of the sump ($T_{przn}$) (e.g., pressurizing port 212) and an internal sump temperature ($T_{sump}$), where a cold sump can be defined based on a temperature ratio of $T_{sump}/T_{przn} \geq 1$ and a hot sump can be defined based on a temperature ratio of $T_{sump}/T_{przn} < 1$. Using examples disclosed herein, oleophobic coating of a cold sump (e.g., internal wall 232 surfaces of a cold sump) can contribute to an increase of ~7% heat dissipation (e.g., using oleophobic coating including perfluoroalkoxy alkane, perfluoroalkyl silane functionalized ceramics, etc.). Overall, an oleophobic coating on a cold sump results in very low oil dispersion (e.g., a contact angle of greater than 90 degrees), reduces the residence time of oil (e.g., by up to 25%), and contributes to a reduction in viscous heat generation (e.g., by up to 27%). Heat dissipation also increases due to the use of an oleophobic coating with a high heat transfer coefficient (HTC) (e.g., heat dissipation increase by 30-80%).

Likewise, an oleophobic coating in a hot sump can include a reduction of sump wall heating by ~20% (e.g., using oleophobic coating materials such as polybenzimidazole or carbon-based materials that are fluoro-modified or nano/micro-textured, etc.). For example, the oleophobic coating 228 on internal and external sump wall 232, 234 surfaces results in very low oil dispersion (e.g., with a contact angle of greater than 90 degrees), reduces residence time of oil (e.g., by 25%), and contributes to a reduction in the generation of viscous heat (e.g., by 27%). Furthermore, insulation of the sump walls (e.g., external and internal wall 232 surfaces) using an oleophobic coating with a low HTC results in decreased sump wall heating. Overall, the surface treatment of cold sumps (e.g., internal wall 232 surfaces) and/or hot sumps (e.g., internal wall 232 and external wall 234 surfaces) results in a significant reduction of viscous heat generation (e.g., by approximately 30%).

Figure 3A:
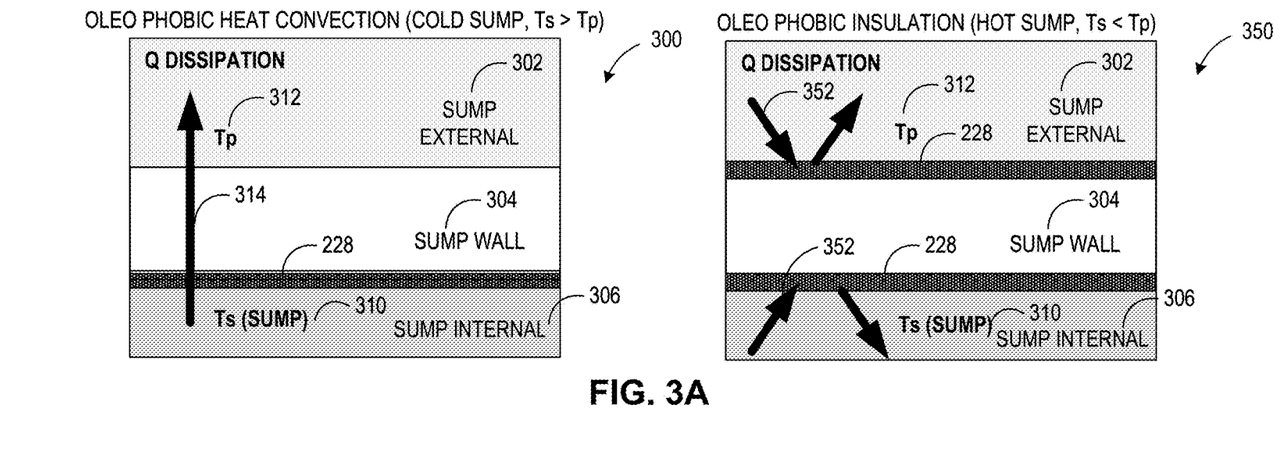
FIG. 3A illustrates example heat dissipation resulting from oleophobic-coated sump walls.

FIG. 3A illustrates example heat dissipation diagram(s) 300, 350 resulting from oleophobic-coated sump walls. In some examples, coating locations within the bearing sump system 200 can be determined based on the location of the sump in the gas turbine engine 110 (FIG. 1) (e.g., hot sump, cold sump, vented sump, non-vented sump, etc.). For example, oleophobic coating 228 on one side of a sump wall (e.g., between the first cavity 208 and the oil seal 206 of FIG. 2A) results in heat convection (e.g., heat (Q) dissipation), from an internal region 306 of the bearing sump system 200, through a sump wall 304, and towards an external region 302 of the bearing sump system 200 (e.g., towards the second cavity 210 of FIG. 2A). As shown in the example of FIG. 3A, a difference in a temperature of a sump's internal region ($T_S$) 310 and a temperature of a sump's external region ($T_P$) 312, corresponding to an area of pressurization (e.g., including the pressurizing port 212 of FIG. 2A), results in $T_S > T_P$, due to a direction 314 of the heat dissipation from the sump's internal region 306 to the sump's external region 302. Conversely, oleophobic coating 228 on both sides of the sump wall 304, as shown in heat dissipation diagram 350, results in insulation rather than heat convection, where the temperature of the sump's internal region ($T_S$) 310 is less than the temperature of the sump's external region ($T_P$) 312 ($T_S < T_P$). For example, heat dissipation 352 is retained within the sump's internal region 310 and/or the sump's external region 302. In the example of the heat dissipation diagram 300, an initial baseline of heat dissipation (e.g., 134 British thermal units per minute (BTU/min)) increases as a result of the use of oleophobic coating 228 on the sump wall 304 (e.g., 144 BTU/min), contributing to an approximately 7% increase in heat dissipation when using coatings with a high HTC. In the example of the heat dissipation diagram 350, an initial heat load baseline on the sump wall 304 (e.g., 184 BTU/min) is decreased as a result of oleophobic coatings 228 on the sump walls 304 (e.g., 148 BTU/min), contributing to an approximately 20% reduction in heat pick up.

Figure 3B:
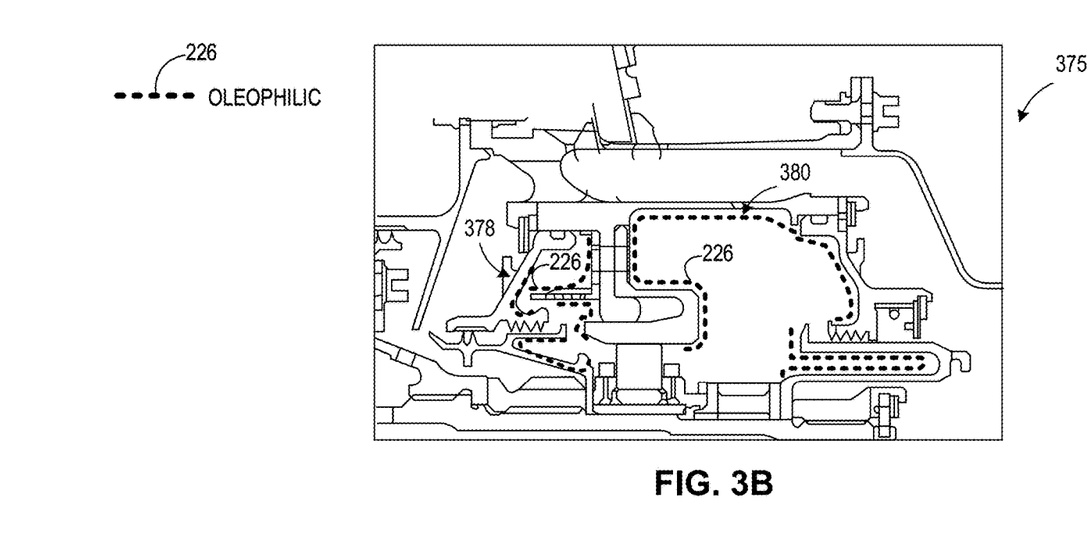
FIG. 3B illustrates example oleophilic coating of sump walls as shown in an example cross-section of the gas turbine engine of FIG. 1.

FIG. 3B illustrates an example diagram 375 of oleophilic coating 226 as shown in an example cross-section of the gas turbine engine 110 of FIG. 1. For example, the diagram 375 includes oleophilic high HTC coating 226 in oil wetted areas of the gas turbine engine 110, including a first location 378 and a second location 380. The first location 378 and second location 380 baseline temperatures (e.g., base metal temperatures without coating) decrease as a result of oleophilic coating 226. For example, the first location 378 temperature decreases from a baseline of 384 degrees Fahrenheit (F) to 368 degrees F. (e.g., a change of 16 degrees F.), whereas the second location 380 temperature decreases from a baseline of 283 degrees F. to 273 degrees F. (e.g., a change of 10 degrees F.), contributing to reduced temperatures of the gas turbine engine 110 metal components following oleophilic-based coatings applied in the first location 378 and the second location 380.

Figure 4:
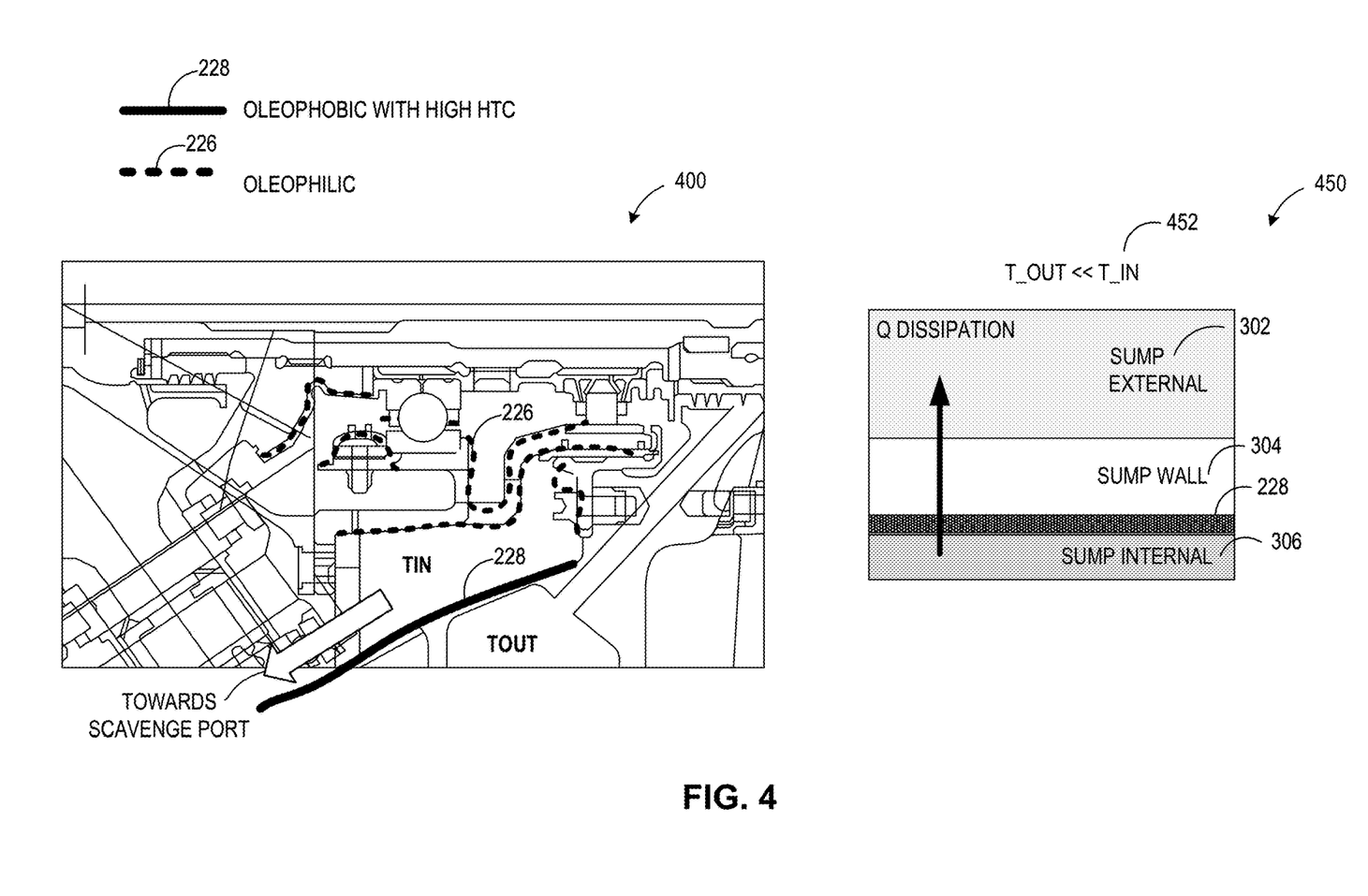
FIG. 4 illustrates an example oleophobic coating with a high heat transfer coefficient (HTC) of cold sump walls in connection with the gas turbine engine of FIG. 1.

FIG. 4 illustrates an example diagram 400 showing oleophobic coating 228 with high heat transfer coefficient (HTC) applied to sump walls and oleophilic coating 226 applied to heat-generating elements (e.g., bearing housing, seal runners, etc.) in connection with the gas turbine engine 110 of FIG. 1. For example, oleophilic coating 226 near heat-generating elements (e.g., the heat-generating elements 204 of FIG. 2A) spreads the oil more efficiently. In some examples, the oleophilic coating 226 used for gas turbine engine components can include carbon-based oleophilic materials with high thermal conductivity (e.g., K=3500 W/mK), the high thermal conductivity assisting in the effective redistribution of heat. In the example of FIG. 4, the oleophobic coating 228 is applied between the sump wall 304 and the sump's internal region 306. The location of the oleophobic coating 228 in the gas turbine engine 110 is shown with respect to the scavenge oil port (e.g., oil drain 214 of FIG. 2A). Oleophobic coatings with a high HTC decrease the residence time of oil on sump internal wall(s) (e.g., the sump internal wall(s) 232 of FIG. 2A) and enhance heat transfer from sump walls to the oil. As shown in diagram 450, the oleophobic coating 228 results in the dissipation of heat towards the sump's external region 302, such that temperature in the external region 302 is lower than the temperature in the internal region 306 (e.g., shown using a relationship 452, where $T_{out} \ll T_{in}$), as described in connection with FIG. 3A.

Figure 5:
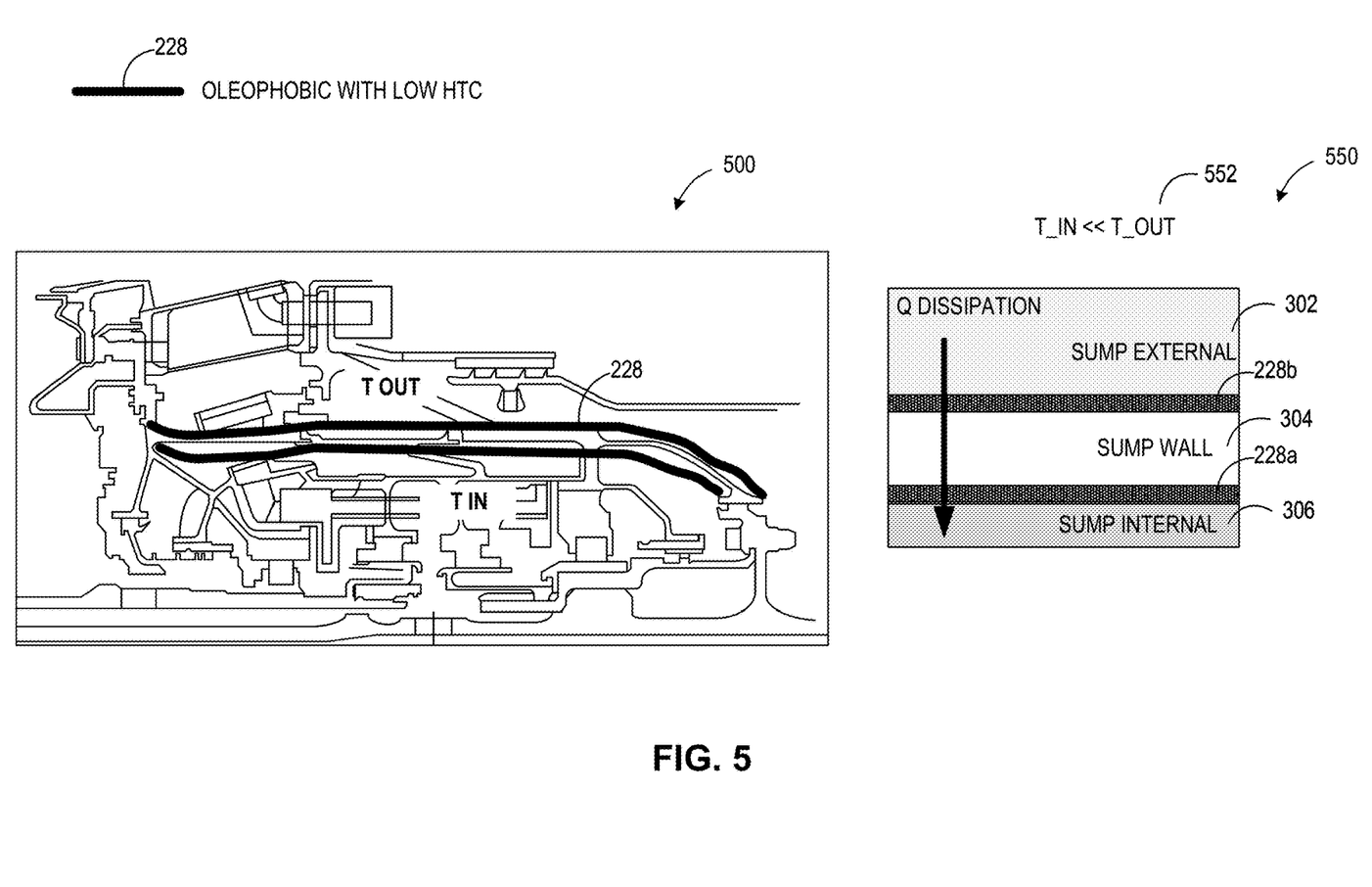
FIG. 5 illustrates an example oleophobic coating with a low heat transfer coefficient (HTC) of hot sump walls in connection with the gas turbine engine of FIG. 1.

FIG. 5 illustrates an example diagram 500 showing the oleophobic coating 228 with a low heat transfer coefficient (HTC) applied to hot sump walls in connection with the gas turbine engine 110 of FIG. 1. In the example of FIG. 5, the oleophobic coating 228 is applied to both sides of the sump wall 304 (e.g., on a sump wall 228a facing the sump's internal region 306 and on a sump wall 228b facing the sump's external region 302). As such, heat dissipation occurs from the sump's external region 302 to the sump's internal region 306, as shown in connection with diagram 550 (e.g., where $T_{in} \ll T_{out}$ in accordance with relationship 552). In some examples, prolonged carbon-based or dust-based deposits on the sumps affect sump heat transfer. However, the introduction of oleophobic coating 228 reduces such deposition. In some examples, oleophobic coating(s) 228 and their corresponding maximum operating temperatures can include perfluoroalkyl alkane (~500° F.), perfluoroalkyl silane functionalized ceramic oxides (~600° F.), fluoro functionalized polymethylsilsesquioxane (~450° F.), and/or polybenzimidazole based compositions (~900° F.). In some examples, oleophilic coating(s) 226 and their corresponding maximum operating temperatures can include functionalized polymeric sponges (e.g., melamine-formaldehyde based sponge) (~530° F.), carbon (e.g., graphite (~1000° F.), graphene (~1650° F.), carbon nanotube (CNT) (~1800° F.)) based sponges, and/or cellulosic fibers (~400° F.). In some examples, the oleophobic and oleophilic chemistries can be applied to a smooth or textured surface, the application on textured surfaces enhancing the effect of the chemistry (e.g., increasing or decreasing the contact angle), whereas re-entrant and/or inverse trapezoidal textures can help with improving oleophobicity.

From the foregoing, it can be appreciated that oleophobic and/or oleophilic coatings can be used to reduce heat loads on gas turbine engine thermal management system (TMS) components. In examples disclosed herein, oleophobic coatings with a high heat transfer coefficient (HTC) on sump internal walls can drive the oil flow towards scavenge ports in a faster manner and enhance heat transfer from sump walls to oil. In examples disclosed herein, oleophilic coatings on areas near the bearings and/or seals spread the oil and result in efficient transfer of heat from a hot surface to the oil. Residence time of oil on the sump internal walls can be reduced, improving overall efficiency. Furthermore, coating of bearings and/or sumps results in lubrication oil durability and the improvement of bearing service life, with an up to 30% improvement in heat management. As such, improved reliability of heat generating elements (e.g., bearings) through a longer service life contributes to a significant weight reduction with the use of more compact heat exchangers. Increased heat loads resulting from changes to gas turbine engine components (e.g., changes in the reduction gear box, presence of additional bearings, higher high-pressure and/or low-pressure turbine speeds, higher air pressurization temperatures, etc.) can be mitigated using the oleophobic and/or oleophilic coatings disclosed herein.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example oleophilic and oleophobic coatings for thermal management of sumps are disclosed herein. Further aspects of the present disclosure are provided by the subject matter of the following clauses.

A method to reduce heat load in a gas turbine engine, the method comprising applying an oleophobic coating to an internal wall of a sump, the sump located in proximity to a heat generating element of the gas turbine engine and applying an oleophilic coating to the heat generating element of the gas turbine engine, the heat generating element positioned in a cavity of the sump.

The method of any preceding clause, wherein the heat generating element includes at least one of a bearing housing or a seal runner.

The method of any preceding clause, wherein the internal wall of the sump is located within the cavity of the sump, the cavity in connection with an oil drain.

The method of any preceding clause, wherein the heat generating element receives oil ejected from an oil jet located in the cavity of the sump.

The method of any preceding clause, wherein the oleophilic coating on the heat generating element lowers a temperature of a metal of the heat generating element from a baseline temperature.

The method of any preceding clause, further including applying the oleophobic coating to an external wall of the sump to lower heating of the external wall.

The method of any preceding clause, further including applying the oleophobic coating to a hot sump, the oleophobic coating including a low heat transfer coefficient.

A sump of a gas turbine engine, the sump comprising a heat generating element and an internal wall of the sump forming a first cavity, the heat generating element including an oleophilic coating and an air seal and an external wall of the sump forming a second cavity, at least one of the internal wall of the sump or the external wall of the sump including an oleophobic coating.

The sump of any preceding clause, wherein the heat generating element includes at least one of a bearing housing or a seal runner.

The sump of any preceding clause, wherein the oleophobic coating applied to the internal wall of the sump includes a low heat transfer coefficient.

The sump of any preceding clause, wherein the oleophobic coating applied to the external wall of the sump includes a high heat transfer coefficient.

The sump of any preceding clause, wherein the heat generating element receives an ejection of oil from an oil jet.

The sump of any preceding clause, wherein the oleophilic coating includes at least one of graphite, graphene, or a carbon nanotube-based sponge.

The sump of any preceding clause, wherein oleophobic coating of a cold sump includes coating of the internal wall of the sump.

The sump of any preceding clause, wherein in a cold sump a ratio of (1) an internal sump temperature to (2) a temperature of air in a pressurizing port of the sump is greater than or equal to one.

The sump of any preceding clause, wherein oleophobic coating of a hot sump includes coating of the internal wall of the sump and the external wall of the sump.

The sump of any preceding clause, wherein in a hot sump the ratio of (1) the internal sump temperature to (2) the temperature of air in the pressurizing port of the sump is less than one.

The sump of any preceding clause, wherein the oleophobic coating includes a perfluoroalkyl alkane, perfluoroalkyl silane functionalized ceramic oxide, fluoro functionalized polymethylsilsesquioxane, or a polybenzimidazole-based composition.

The sump of any preceding clause, wherein the oleophilic coating includes a functionalized polymeric sponge, carbon, graphene, a carbon nanotube-based sponge, or cellulosic fibers.

A sump system of a gas turbine engine, the sump system comprising an oleophilic coating applied to a heat generating element of the sump system, the heat generating element at least one of a bearing housing or a seal runner, and an oleophobic coating applied to an internal wall of a sump surrounding the heat generating element.

The sump system of any preceding clause, wherein the sump system is a cold sump system or a hot sump system, the oleophobic coating applied based on positioning of the sump system in the gas turbine engine.

The sump system of any preceding clause, wherein oleophobic coating of the hot sump system includes coating of the internal wall of the sump and an external wall of the sump.

The sump system of any preceding clause, wherein the oleophobic coating applied to the external wall of the sump includes a high heat transfer coefficient.

The sump system of any preceding clause, wherein the oleophobic coating applied to the internal wall of the sump includes a low heat transfer coefficient.

What is claimed is:
1. A method to reduce heat load in a gas turbine engine, the method comprising:
   applying an oleophobic coating to an internal wall of a sump, the sump located in proximity to a heat generating element of the gas turbine engine; and applying an oleophilic coating to the heat generating element of the gas turbine engine, the heat generating element positioned in a cavity of the sump.

2. The method of claim 1, wherein the heat generating element includes at least one of a bearing housing or a seal runner.

3. The method of claim 1, wherein the internal wall of the sump is located within the cavity of the sump, the cavity in connection with an oil drain.

4. The method of claim 1, wherein the heat generating element receives oil ejected from an oil jet located in the cavity of the sump.

5. The method of claim 1, wherein the oleophilic coating on the heat generating element lowers a temperature of a metal of the heat generating element from a baseline temperature.

6. The method of claim 1, further including applying the oleophobic coating to an external wall of the sump to lower heating of the external wall.

7. The method of claim 6, further including applying the oleophobic coating to a hot sump, the oleophobic coating including a low heat transfer coefficient.

8. A sump of a gas turbine engine, the sump comprising:
a heat generating element and an internal wall of the sump forming a first cavity, the heat generating element including an oleophilic coating;
an air seal and an external wall of the sump forming a second cavity, at least one of the internal wall of the sump or the external wall of the sump including an oleophobic coating.

9. The sump of claim 8, wherein the heat generating element includes at least one of a bearing housing or a seal runner.

10. The sump of claim 8, wherein the oleophobic coating applied to the internal wall of the sump includes a low heat transfer coefficient.

11. The sump of claim 8, wherein the oleophobic coating applied to the external wall of the sump includes a high heat transfer coefficient.

12. The sump of claim 8, wherein the heat generating element receives an ejection of oil from an oil jet.

13. The sump of claim 8, wherein the oleophilic coating includes at least one of graphite, graphene, or a carbon nanotube-based sponge.

14. The sump of claim 8, wherein oleophobic coating of a cold sump includes coating of the internal wall of the sump.

15. The sump of claim 8, wherein oleophobic coating of a hot sump includes coating of the internal wall of the sump and the external wall of the sump.

16. A sump system of a gas turbine engine, the sump system comprising:
an oleophilic coating applied to a heat generating element of the sump system, the heat generating element at least one of a bearing housing or a seal runner; and
an oleophobic coating applied to an internal wall of a sump surrounding the heat generating element.

17. The sump system of claim 16, wherein the sump system is a cold sump system or a hot sump system, the oleophobic coating applied based on positioning of the sump system in the gas turbine engine.

18. The sump system of claim 17, wherein oleophobic coating of the hot sump system includes coating of the internal wall of the sump and an external wall of the sump.

19. The sump system of claim 18, wherein the oleophobic coating applied to the external wall of the sump includes a high heat transfer coefficient.

20. The sump system of claim 16, wherein the oleophobic coating applied to the internal wall of the sump includes a low heat transfer coefficient.

\* \* \* \* \*